A. McCreight,
Reciprocating Saw Mill.

No. 4,101. Reissued Aug. 16, 1870.

Witnesses:
Fred. Thomas
W. E. Stumph.

Inventor:
A. McCreight by
W. W. Beadle Att'y.

N. PETERS, PHOTO-LITHOGRAPHER, WASHINGTON, D. C.

United States Patent Office.

ALEXANDER McCREIGHT, OF TRANQUILITY, OHIO.

*Letters Patent No.* 82,970, *dated October* 13, 1868; *reissue No.* 4,101, *dated August* 16, 1870.

IMPROVEMENT IN SAW-MILLS.

The Schedule referred to in these Letters Patent and making part of the same.

*To all whom it may concern:*

Be it known that I, ALEXANDER McCREIGHT, of Tranquility, in the county of Adams and State of Ohio, have invented certain Improvements in Saw-Mills; and I do hereby declare that the following is a full, clear, and exact description thereof, reference being had to the annexed drawing making part of this specification, in which—

Corresponding letters refer to corresponding figures in the several figures.

This invention consists in the combination and arrangement of the parts of which it is composed, as will be more fully explained hereinafter.

It is well known that, in sawing logs of considerable length, when the slab is removed from one side of such log by an upright saw, the log springs laterally to a considerable extent, thus causing the next portion of the log to be cut therefrom, whether it be a plank or a board, to be of unequal thickness at different parts of its length, and, consequently, causing a waste of timber. This difficulty I avoid, by arranging the saw and the parts which operate in it in such a manner that the saw is run in horizontal planes, while the log rests on the roller or cross-beams of the carriage.

The main frame, which supports the saw and driving machinery in my improved mill, consists of the longitudinal timbers A A, properly secured by transverse beams.

On one side of this frame are fixed trestles, B B, which carry, in proper bearings, the shaft C. To one end of this shaft the power is applied, and on the other is fixed a balance-wheel, D, in which is a crank-pin, to which the connecting-rod *a*, which moves the saw, is attached.

One of the beams A A supports four vertical posts, *b b b′ b′*, which are suitably strengthed by braces.

Upon the frame composed of these posts, *b b b′ b′* and beam, *c*, slides vertically the frame *d d d′ d′*.

Figure 1:
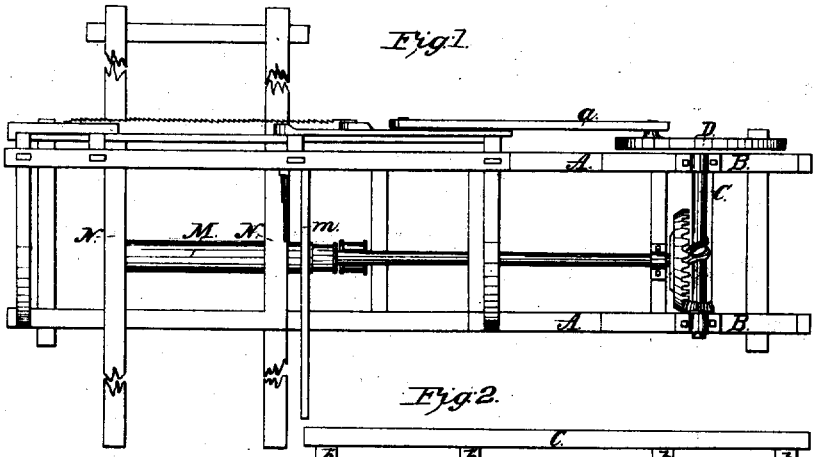
Figure 1 is a plan view of my improved mill, showing the carriage-way and frame-work for supporting the driving-wheel and connecting-rod which unites it with the cross-head of the saw.
Figure 2:
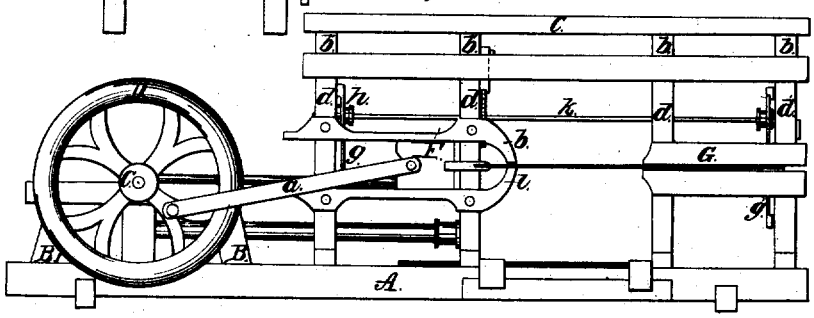
Figure 2 is a front view of the saw, with its supporting-frame, guides, and connections.
Figure 3:
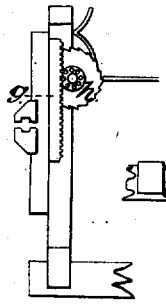
Figure 3 is a view of the devices by which the saw-frame is raised and lowered.
Figure 4:
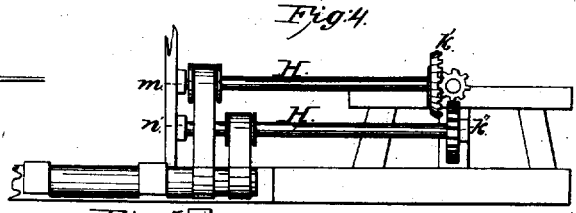
Figure 4 is a detached view of the shafts, belts, and bevel-wheels, and their connections, by which the log is forced up to the saw and carried back from it.
Figure 5:
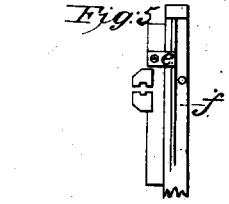

This frame is held upon the fixed frame by guides *e e*, fig. 3, which slide in the grooves *f f* in the outer vertical posts.

This frame carries two ratchet-bars, *g g*, which gear into ratchet-wheels *h h*, on the horizontal shaft *k*, which has its bearings in the fixed frames before described.

This shaft is rotated by a pivoted lever, which catches into a ratchet-wheel, into which wheel also falls a pawl, to retain the frame at any required height.

On the two upright posts *b′ b′*, of the movable frame, is fixed the guide F, so constructed as to guide the head-block or cross-head of the saw, while its jaws, *b b*, projecting forward and inward, guide the blade of the saw.

To the other uprights. *b b*, of the frame, the guide G is attached. This is made straight, in two parts, like the former, and provided with a groove, in which the foot-block of the saw runs.

On the trestles B B are two transverse beams, in which are the fixed bearings for the horizontal shafts H H′.

The upper or crown-wheel K′, on shaft H, gears into a cog-wheel on the end of shaft G, and is rotated by its revolution.

The under wheel K″, on shaft H′, gears into a cog-wheel on the end of shaft C, and is rotated by its revolution.

The under wheel K″, on shaft H′, is revolved by the worm-screw, also on shaft C.

Both these shafts, H and H′, have their other bearings in boxes, *m m′*, which boxes serve to tighten or loosen the bands or belts, which transmit the motion of the shafts to the lower shaft M. This shaft extends beneath the carriage-way and actuates the head-blocks carrying the logs.

The carriage N N is fixed, and is provided with a head-block, which may have friction-rollers on which the log rests, and on which it moves forward and backward, and to which the ropes from the shaft M are attached, to move the log forward and backward.

The carriage N N may, obviously, be so constructed as to be removable, when the mill is carried from one place to another. The whole mill would then be in such shape as to be conveniently placed on wheels for transportation.

The operation of my improved mill may easily be understood from the description of its parts.

The power is applied to the shaft C by means of a pulley or other suitable device, and the pin in the wheel D operates the saw, and, through the described gearing, moves the log on the carriage.

The post of the sawyer is at the boxes *m m′*, by manipulating which he is able to guide the log back and forth at pleasure.

The slab being taken from the upper side of the log, it is prevented from springing, as before explained.

By rotating, or partially rotating the shaft K, by means of the lever attached thereto, the operator is enabled to lower or raise the saw, so as to cut any desired thickness of lumber.

For cutting logs into sections, for fuel or for other purposes, I provide guides, of the same construction, except that they permit the edge of the saw to be turned downward. Then the vertical movement of the sliding frame carries the saw vertically through the log; while the devices for carrying the log forward operate at intervals, as before, according to the will of the operator.

Having thus described my invention,

I claim, and desire to secure by Letters Patent—

1. The arrangement, as herein shown and described, of the frame A A, which supports the saw, and to which the guides F F and G are attached, with reference to the mechanism for elevating and depressing the saw, and to the carriage or way upon which the log is placed, as a consequence of which such log may be sawed longitudinally into boards, of equal or unequal thickness, by the horizontal movements of the saw in different planes, substantially as and for the purpose set forth.

2. The ratchet-bars *g g*, ratchet-wheels *h h*, and shaft K, when combined with the fixed frame *b b b′ b′*, moving frame *d d d′ d′*, and operated substantially as and for the purpose set forth.

3. The shaft C of the described mill, in combination with the shaft H and H′, with their connections of gearing upon the shaft C, and bearing in the boxes *m m′*, and connecting-bands with roller M, all substantially as and for the purpose set forth.

In testimony whereof I have signed my name to this specification before two subscribing witnesses.

ALEXANDER McCREIGHT.

Witnesses:

D. P. HOLLOWAY,

B. EDW. J. EILS.